W. LAYTON.
RESILIENT WHEEL.
APPLICATION FILED DEC. 4, 1915.
1,269,465.
Patented June 11, 1918.
2 SHEETS—SHEET 2.
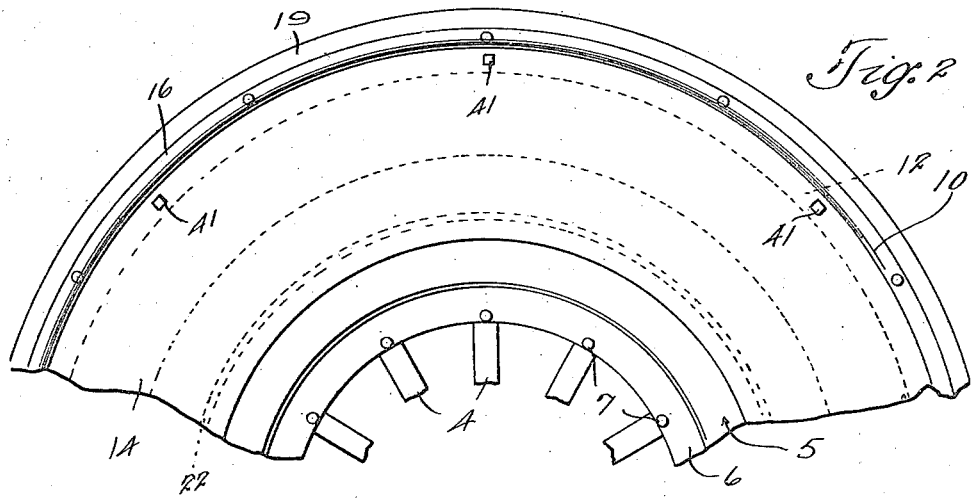
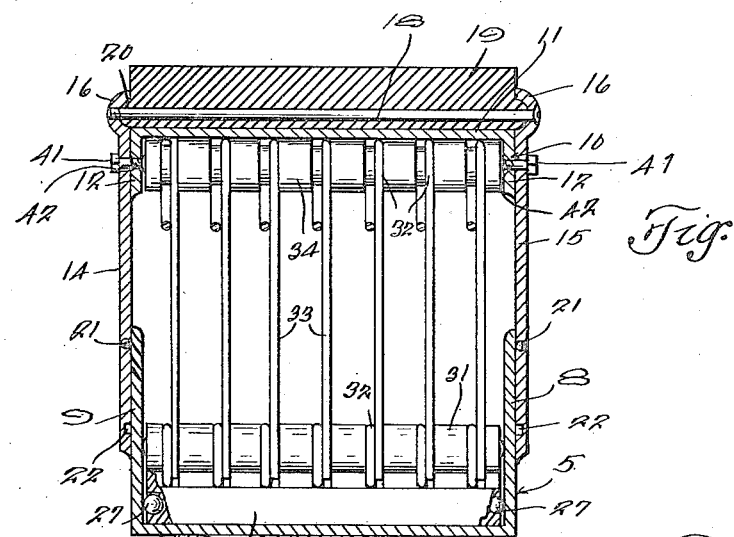
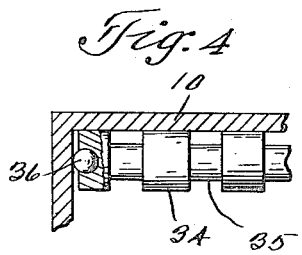
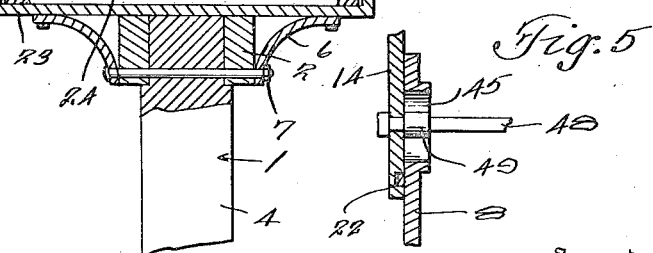
Inventor
Wm. Layton

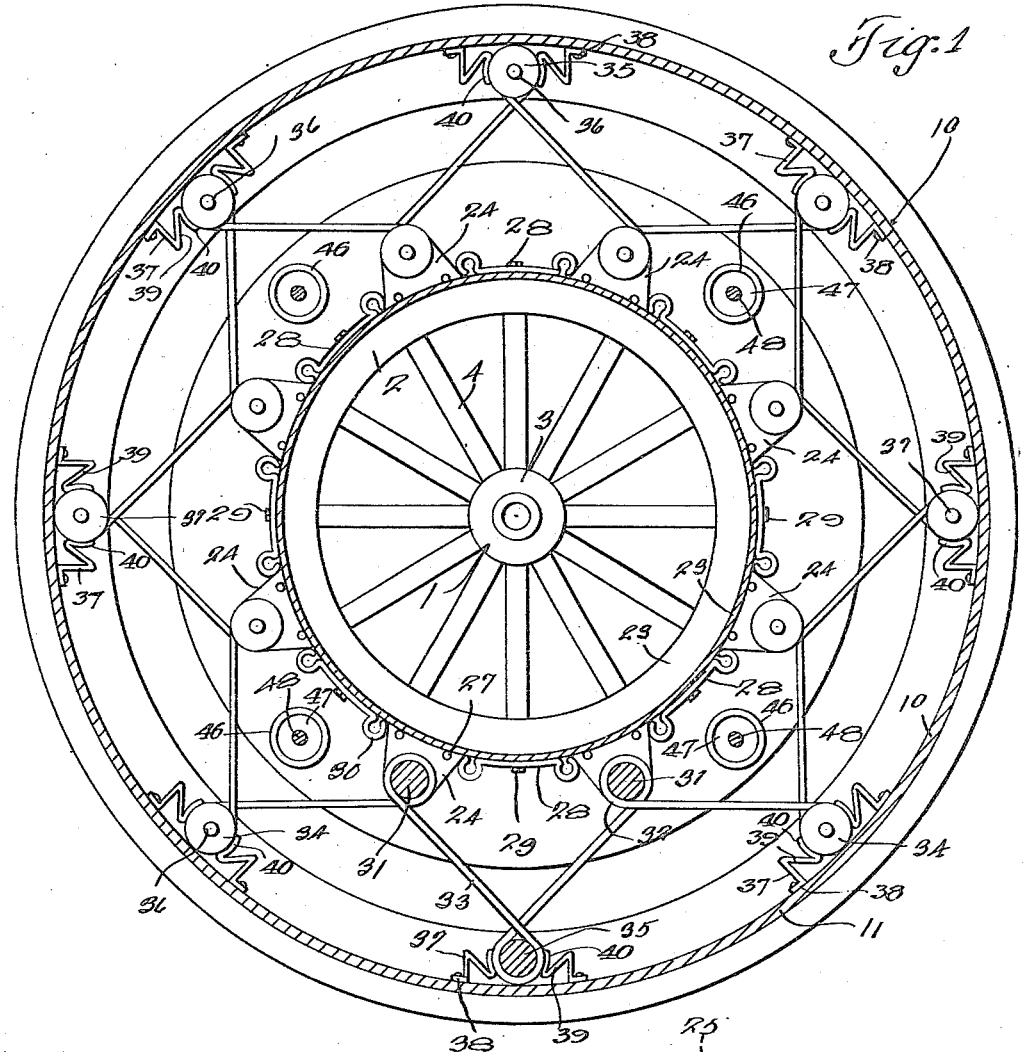
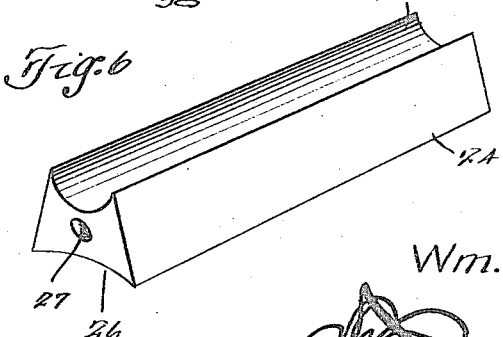

UNITED STATES PATENT OFFICE.

WILLIAM LAYTON, OF SEA GIRT, NEW JERSEY.

RESILIENT WHEEL.

1,269,465.  Specification of Letters Patent.  Patented June 11, 1918.

Application filed December 4, 1915. Serial No. 65,044.

*To all whom it may concern:*

Be it known that I, WILLIAM LAYTON, a citizen of the United States, residing at Sea Girt, in the county of Monmouth and State of New Jersey, have invented certain new and useful Improvements in Resilient Wheels; and I do hereby declare the following to be a full, clear, and exact description of the invention, such as will enable others skilled in the art to which it appertains to make and use the same.

This invention relates to resilient wheels, and the primary object of the invention is to provide a resilient wheel structure which is constructed to permit of a yieldable movement of the tire or tread section of the wheel independent of the hub section for absorbing shocks occasioned by the travel of the vehicle upon which the wheel is mounted, over rough places.

Another object of this invention is to provide a resilient wheel structure as specified which includes a hub section and a rim section and a plurality of resilient springs connecting the hub section to the rim section, and to mount said springs so as to permit of a limited circumferential movement of the tread section with respect to the hub section of the wheel.

Another object of this invention is to provide in a resilient wheel structure as specified, a tread section which is mounted for limited yieldable movement radially of the hub section and to provide means for limiting the movement of the tread or rim section of the wheel independent of the hub section thereof.

A still further object of this invention is to provide a novel manner of connecting the resilient springs or rods to the rim and hub sections of the wheel.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a sectional view through the wheel.

Fig. 2 is a fragmentary view of the wheel showing the exterior of the casing of the same.

Fig. 3 is a transverse section through the wheel.

Fig. 4 is a fragmentary detail section of a part of the wheel structure showing the means employed for connecting the wheel springs.

Fig. 5 is a detail sectional view showing the means for limiting the movement of the outer rim section radially with respect to the inner hub section, and Fig. 6 is a detail perspective view of a spring seat used in the construction of the wheel.

Referring more particularly to the drawings, 1 designates the hub section of the wheel as an entirety, which has a rim 2 connected to the hub proper 3 of the wheel by a plurality of radiating spokes 4. A rigid substantially U-shaped casing section 5 is detachably connected to the rim 2 by means of suitable brackets 6 and bolts 7. The casing 5 extends circumferentially about the wheel hub section and has outwardly extending sides 8 and 9 which extend over a portion of the distance between the rim 2 of the hub section 1 and the rim 10 of the rim portion. The rim 10 is composed of a metallic plate 11 which has depending sides 12 that abut the inner surface of the side plates 14 and 15 of the outer movable section of the casing which incloses the resilient springs of the tire or wheel. The sides 14 and 15 have beads 16 formed upon their outer edges through which bolts 18 extend. The bolts 18 also extend through the tread or tire 19 of the wheel which may be constructed of any suitable noiseless material, such as rawhide, fiber, rubber or analogous material. A tread or tire 19 has annular transversely extending rings 20 formed thereon for seating in the concave portions of the beads 16 as is clearly shown in Fig. 3 of the drawings.

The side plates 14 and 15 have roller bearings as indicated at 21 positioned therein which engage the outer surface of the upstanding sides 8 and 9 for eliminating the friction occasioned by the movement of the movable outer section of the wheel. The guides 14 and 15 are also provided with annular recesses 22, in which any suitable type of packing material may be inserted for preventing dust from passing inwardly between the engaging portions of the sides 14 and 15 and 8 and 9.

The bight portion 23 of the U-shaped casing 5 has a plurality of spaced spring seats 24 engaging its outer circumference at spaced intervals. The seats 24 are provided with concaved recesses 25 in their outer surfaces. The bases of the spring seats 24 are concavely cut as is shown at 26 for fitting snugly against the periphery of the bight portion 23. The spring seats 24 are provided with ball races formed in their ends, in which ball bearings 27 are seated. The bearing balls 27 engage the inner surfaces of the flanges 8 and 9. Flat springs 28 are secured to the periphery of the bight portion 23 intermediate of the spring seats 24, by bolts or analogous fastening devices 29 and they have their ends curved as is clearly shown at 30 and engaging the sides of the spring seats 24. The ends of the springs 28 are rolled or coiled forwardly, so as to permit of a limited yieldable movement of the spring seats 24, circumferentially of the bight portion 23 and the hub section 1.

A plurality of rods 31 are positioned in the concave troughs or recesses 25, and they are provided with a plurality of reduced portions 32 equally spaced longitudinally of the rods in which reduced portions the resilient rods or bars 33 are coiled. The resilient rods 33 are coiled about the rods 31 and the coils are seated in the reduced portions 32, and they extend tangentially from the rods 31 to rods 34, which are carried by the rim 10. The rods 34 are provided with reduced portions 35 about which the resilient rods 33 are coiled and they extend tangentially from one of the rods 34 to the rod 31 next thereto, as is clearly shown in Fig. 1 of the drawings forming a continuous resilient connection between the rim section of the wheel and the hub section of the wheel.

The rods 34 have ball bearings 36 mounted in their ends which engage the inner surfaces of the inwardly extending flanges 12 as clearly shown in Fig. 4. The rods 34 are supported for a limited yieldable movement circumferentially of the wheel by resilient or spring members 37 which are secured to the inner surface of the thread portion or the periphery 11 of the rim 10, in any suitable manner as indicated at 38. The flat resilient or spring members 37 have inwardly extending straight portions 39, which are bent outwardly at an incline thereto, after they extend inwardly a relatively short distance, and are again bent as is shown at 40 to form curved rod engaging portions which will permit of a limited yieldable movement of the roller circumferentially of the rim 10.

The flanges 12 are attached to the sides 14 and 15 by suitable bolts 41, which extend through bolt holes in the sides and flanges. The bolt holes 42, through which the bolts 41 extend lead inwardly to the ends of the rods 34, so that the ends of the rollers may be lubricated through the bolt holes if desired. At spaced intervals about the circumference of the wheel, the rigid flanges 8 and 9 have circular enlargements 45 formed therein, which comprise inwardly extending circular rings 46 which surround a circular opening 47, which extends through the flanges. Rods 48 extend transversely across from the flange 8 to the flange 9, and are connected to the sides 14 and 15 in any suitable manner. Rollers 49 are mounted upon the ends of the rods 43 and are adapted for riding about the inner circumference of the circular flanges 46 for limiting the movement of the sides 14 and 15 and the rim section of the wheel with respect to the rigid hub section thereof.

The rods 33 will resiliently or yieldably hold the outer movable rim section of the wheel in spaced relation to the rigid hub section of the wheel and will permit of the limited cushioning or yieldable movement of the rim section with respect to the hub section for the purpose of absorbing shocks and the resilient mounting of the rods 31 and 34 will permit of the limited circumferential movement of the rods and consequently of the rods 33 with respect to both the rim section and the hub section of the wheel.

From the foregoing description taken in connection with the accompanying drawings the advantages of construction and of the method of operation of the improved resilient wheel will be readily apparent to those skilled in the art to which this invention appertains and, while in the foregoing description, the principle of the operation of this invention has been described together with various features of construction it is to be understood that certain minor features of construction, combination and arrangement of parts may be altered to suit practical conditions provided such alterations are comprehended within the scope of what is claimed.

What is claimed is:—

1. A resilient wheel including an inner wheel structure, a rim arranged in spaced relation to said wheel structure and carrying a tire, spring seats carried by the wheel structure and capable of circumferential movement in relation thereto, resilient means limiting the movement of said seats, rods carried by said seats, springs connected to said rods, and means connecting said springs to the rim.

2. A resilient wheel including an inner wheel structure, a rim arranged in spaced relation to said wheel structure and carrying a tire, spring seats carried by the wheel structure and capable of circumferential movement in relation thereto, resilient members secured to the wheel structure between the seats and having their free ends curved to form tension means for limiting the movement of the seats, rods carried by said seats, springs connected to said rods, and means connecting said springs to the rim.

3. A resilient wheel including an inner wheel structure, a rim arranged in spaced relation to said wheel structure and carrying a tire, spring seats carried by the wheel structure and capable of circumferential movement in relation thereto and having their outer faces concaved, means limiting the movement of said seats, rods located within the concaved faces of the seats, springs connected to said rods, means connecting said springs to the rim, and means limiting the circumferential movement of the rim in relation to the wheel structure.

4. A resilient wheel including an inner wheel structure, a rim arranged in spaced relation to said wheel structure and carrying a tire, spring seats carried by the wheel structure and capable of circumferential movement in relation thereto, means limiting the movement of said seats, rods carried by said seats, rods carried by the rim and capable of circumferential movement in relation thereto, and resilient rods connecting the first and second named rods.

5. A resilient wheel including an inner wheel structure, a rim arranged in spaced relation to said wheel structure and carrying a tire, spring seats carried by the wheel structure and capable of circumferential movement in relation thereto, means limiting the movement of said seats, rods carried by said seats and having reduced portions, rods carried by the rim and having reduced portions, resilient means carried by the rim and engaging the second named rods to permit said rods to have circumferential movement in relation to the rim, and resilient rods wound about the reduced portions of the first and the second named rods to form a cushioning means between the rim and the wheel structure.

6. A resilient wheel including an inner wheel structure, a rim arranged in spaced relation to said wheel structure and carrying a tire, spring seats carried by the wheel structure and capable of circumferential movement in relation thereto, means limiting the movement of said seats, rods carried by said seats, pairs of relatively spaced resilient members carried by the rim, rods carried by each pair of the resilient members and which members permit circumferential movement of the second named rods in relation to the rim, and resilient rods connecting the first and second named rods together to form a cushioning means between the rim and the wheel structure.

In testimony whereof I affix my signature in presence of two witnesses.

WILLIAM LAYTON.

Witnesses:
  GORDON PATTERSON,
  GARRET A. CURTIS.